(12) United States Patent
Watson et al.

(10) Patent No.: US 8,340,372 B2
(45) Date of Patent: Dec. 25, 2012

(54) IMAGE ANALYSIS

(75) Inventors: Sharon Katrina Watson, Farnborough (GB); Graham Howard Watson, Farnborough (GB)

(73) Assignee: Qinetiq Limited (GB)

( * ) Notice: Subject to any disclaimer, the term of this patent is extended or adjusted under 35 U.S.C. 154(b) by 1003 days.

(21) Appl. No.: 10/538,150

(22) PCT Filed: Dec. 12, 2003

(86) PCT No.: PCT/GB03/05445
§ 371 (c)(1),
(2), (4) Date: Jun. 8, 2005

(87) PCT Pub. No.: WO2004/055733
PCT Pub. Date: Jul. 1, 2004

(65) Prior Publication Data
US 2006/0013455 A1    Jan. 19, 2006

(30) Foreign Application Priority Data
Dec. 17, 2002    (GB) .................................. 0229338.9

(51) Int. Cl.
*G06K 9/00*    (2006.01)
(52) U.S. Cl. ........................... 382/128; 382/133; 382/266
(58) Field of Classification Search .................. 382/128, 382/133, 266
See application file for complete search history.

(56) References Cited

U.S. PATENT DOCUMENTS

| | | | |
|---|---|---|---|
| 5,363,850 A * | 11/1994 | Soni et al. ...................... 600/454 |
| 6,493,460 B1 | 12/2002 | MacAulay et al. | |
| 2002/0012466 A1 * | 1/2002 | DeLong ........................ 382/224 |
| 2002/0164063 A1 | 11/2002 | Heckman | |

OTHER PUBLICATIONS

Madachy R J et al., "Image Analysis for Automatic Classification of Mitotic Cervical Cells," 1998, IEEE, vol. 1, pp. 372-374.*
Netsch T et al., "Scale-Space Signatures for the Detection of Clustered Microcalcifications in Digial Mammograms," Sep. 1999, IEEE, vol. 18, pp. 774-786.*
Drezet, et al., "Automatic Mitotic Index Estimation for the Prognostication of Breast Cancer from Histology Images", The Institute of Electrical Engineers, p. 14/1-14/3 (1998).
Madachy et al., "Image Analysis for Automatic Classification of Mitotic Cervical Cells", IEEE, pp. 372-374 (1988).
Hibbard et al.,"Multiscale Detection and Analysis for the Senile Plaques of Alzheimer's Disease", IEEE, pp. 1218-1225 (1995).
Netsch et al., "Scale-Space Signatures for the Detection of Clustered Microcalcifications in Digital Mammograms", Medline/NLM, pp. 774-786 (1999).

(Continued)

*Primary Examiner* — John Strege
(74) *Attorney, Agent, or Firm* — McDonnell Boehnen Hulbert & Berghoff LLP

(57) ABSTRACT

A method for the automated analysis of digital images, particularly for the purpose of assessing mitotic activity from images of histological slides for prognostication of breast cancer. The method includes the steps of identifying the locations of objects within the image which have intensity and size characteristics consistent with mitotic epithelial cell nuclei, taking the darkest 10% of those objects, deriving contours indicating their boundary shape, and smoothing and measuring the curvature around the boundaries using a Probability Density Association Filter (PDAF). The PDAF output is used to compute a measure of any concavity of the boundary—a good indicator of mitosis. Objects are finally classified as representing mitotic nuclei or not, as a function of boundary concavity and mean intensity, by use of a Fisher classifier trained on known examples.

23 Claims, 5 Drawing Sheets

OTHER PUBLICATIONS

Lindeberg, "Feature Detection with Automatic Scale Selection", Int'l Journal of Computer Vision, pp. 79-116 (1998).

Jones et al.,"Multiresolution Analysis of Remotely Sensed Imagery", Int. J. Remote Sensing, pp. 107-124, (1991).

* cited by examiner (a)

(b)

(c)

(d)

(a)

(b)

(c)

IMAGE ANALYSIS

FIELD OF THE INVENTION

The present invention relates to the automated analysis of digital images. It is more particularly concerned with the automated identification of mitotic activity in digital images of histological or cytology specimens and most particularly for the purpose of assessing the presence and severity of cancer in breast tissue, and it is in this context that the invention is principally described herein. The invention may, however, also find application in the assessment of other forms of cancer, such as colon and cervical cancer, and in the analysis of various other kinds of structure presenting image components which are amenable to identification in a similar way, for example in the analysis of soil samples containing certain types of seeds or other particles.

BACKGROUND AND SUMMARY OF THE INVENTION

Many thousands of women die needlessly each year from breast cancer, a cancer from which there is theoretically a high probability of survival if detected sufficiently early. If the presence of cancerous tissue is missed in a sample, then, by the time the next test is undertaken, the cancer may have progressed and the chance of survival significantly reduced. The importance of detecting cancerous tissue in the samples can therefore not be over-emphasised.

A typical national breast screening programme uses mammography for the early detection of impalpable lesions. Once a lesion indicative of breast cancer is detected, then tissue samples are taken and examined by a trained histopathologist to establish a diagnosis and prognosis. More particularly, one of the principal prognostic factors for breast cancer is the extent of mitotic activity, that is to say the degree of epithelial cell division that is taking place. A histopathological slide is effectively a "snapshot" representing a very short time interval in a cell division process, so the chance of a particular slide showing a particular phase of mitotic activity is very small; if such a phase is in fact present in a slide, that is a good indicator of how fast a potential tumour is growing.

In the existing manual procedure for scoring mitotic activity a histopathologist places a slide under a microscope and examines a region of it (referred to as a tile) at a magnification of ×40 for indications of mitoses. Typically ten different tiles from the tissue sample are examined and a total count is made of the number of cell divisions which, in the histopathologist's opinion, are seen to be taking place in the ten tiles. This is then converted to an indication of cancer grade typically in accordance with the following table:

| Number of Mitotic Cells per Ten Tiles | Cancer Grade |
| --- | --- |
| 0 to N | Grade 1 |
| (N + 1) to M | Grade 2 |
| >M | Grade 3 | where Grade 1 is the least serious and Grade 3 is the most serious. Values of N and M are typically 5 and 10 but will vary in different schemes depending on the size of the tiles being observed.

This is, however, a time consuming, labour intensive and expensive process. Qualification to perform such examination is not easy to obtain and requires frequent review. The examination itself requires the interpretation of colour images by eye, a highly subjective process characterised by considerable variations in both inter, and intra-observer analysis, i.e. variances in observation may occur for the same sample by different histopathologists, and by the same histopathologist at different times. For example, studies have shown that two different histopathologists examining the same ten samples may give different opinions on three of them, an error of 30%. This problem is exacerbated by the complexity of some samples, especially in marginal cases where there may not be a definitive conclusion. If sufficient trained staff are not available this impacts upon pressures to complete the analysis, potentially leading to erroneous assessments and delays in diagnosis.

These problems mean that there are practical limitations on the extent and effectiveness of screening for breast cancer with the consequence that some women are not being correctly identified as having the disease and, on some occasions, this failure may result in premature death. Conversely, others are being incorrectly diagnosed with breast cancer and are therefore undergoing potentially traumatic treatment unnecessarily.

It is thus an aim of the invention to provide an automated method of image analysis which can be embodied in a robust, objective and cost-effective tool to assist in the diagnosis and prognosis of breast cancer, although as previously indicated the invention may also find application in other fields.

In one aspect the invention accordingly resides in a method for the automated analysis of a digital image comprising an array of pixels, including the steps of: identifying the locations of objects within the image which have specified intensity and size characteristics; defining regions of specified extent within the image which contain respective said objects; deriving from the data within respective said regions one or more respective closed contours comprising points of equal intensities; and estimating the curvature of at least one respective said contour within respective said regions at least to produce a measure of any concavity thereof.

As will be understood from the ensuing detailed description of a preferred embodiment, such a method is of use in identifying mitotic cell nuclei in digital images of histopathological slides.

The invention also resides in apparatus for the automated analysis of a digital image comprising means to perform the foregoing method and in a computer program product comprising a computer readable medium having thereon computer program code means adapted to cause a computer to execute the foregoing method and in a computer program comprising instructions so to do.

These and other aspects of the invention will now be more particularly described, by way of example, with reference to the accompanying drawings and in the context of an automated system for grading cancer on the basis of the numbers of mitotic epithelial cell nuclei in digital images of histopathological slides of potential carcinomas of the breast.

DETAILED DESCRIPTION

Figure 1:
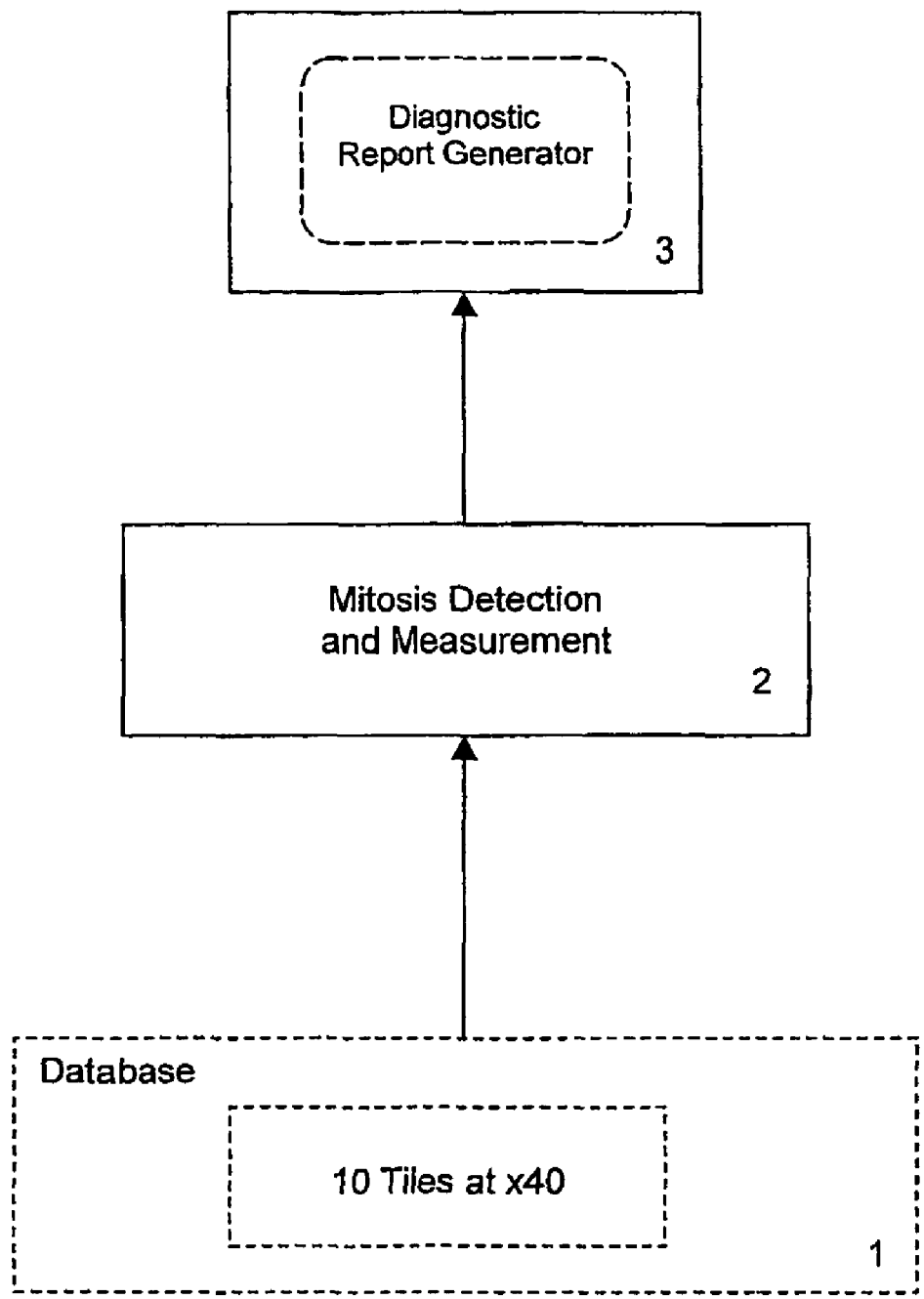
FIG. 1 is a block diagram of an automated process in accordance with the invention for measuring mitotic activity for patient diagnosis.

FIG. 1 shows a process for the assessment of tissue samples in the form of histopathological slides of potential carcinomas of the breast. The process measures mitotic activity of epithelial cells to produce a parameter for use by a pathologist as the basis for assessing patient diagnosis. It employs a database 1, which maintains digitised image data obtained from histological slides. Sections are cut from breast tissue samples (biopsies), placed on respective slides and stained using the staining agent Haematoxylin & Eosin (H&E), which is a common stain for delineating tissue and cellular structure.

To obtain the digitised image data for analysis, a histopathologist scans a slide under a microscope and at 40× magnification selects regions of the slide which appear to be most promising in terms of analysing mitotic activity. Each of these regions is then photographed using the microscope and a digital camera. In one example a Zeiss Axioskop microscope has been used with a Jenoptiks Progres 3012 digital camera. This produces for each region a respective digitised image in three colours, i.e. red, green and blue (R, G & B). Respective intensity values in the R, G and B image planes are thus obtained for each pixel in an array. In the preferred embodiment there is an eight-bit range of pixel intensities (values of 0 to 255) for each colour and the array comprises 1476 pixels across by 1160 pixels down, with a pixel size of 220 nm square. The image data is stored temporarily at 1 for later use. Ten digitised images (electronic equivalents of tiles) are required for the detection and measurement of mitotic activity at 2, which then provides input to a diagnostic report at 3. In principle the processing stages to be described in detail below can operate on a single waveband (R, G or B) image or a combination of them. In practice, however, the red waveband has been found to contain the most information for discriminating between mitotic and other cells when stained with H&E, and is assumed to be used in the following description. The process can be performed in a suitably programmed personal computer (PC) or other general purpose computer of suitable processing power or in dedicated hardware.

Figure 2:
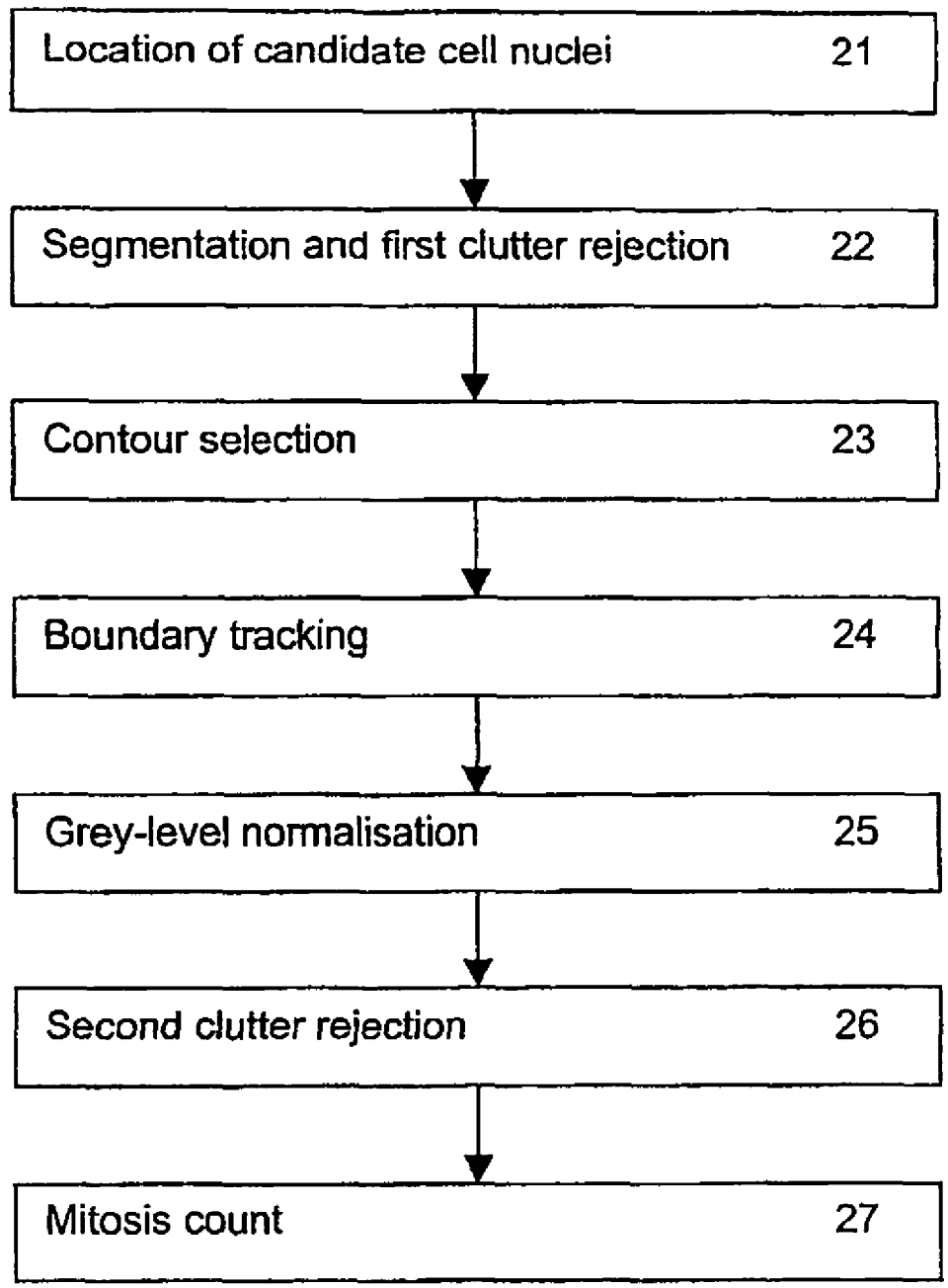
FIG. 2 is a more detailed block diagram of the main stages in the mitosis detection and measurement block of FIG. 1.

FIG. 2 shows in more detail the processing stages comprised in the block 2 of FIG. 1. They are carried out for each of the ten digitised images referred to above and will now be described for one such image (file). To aid in the understanding of this description it is recalled that the aim of the process is to identify and count the number of mitotic epithelial cell nuclei (if any) in each tile. In images acquired as described above such nuclei generally appear darker than normal epithelial cell nuclei, and also have a different shape. Normal nuclei are generally convex with smooth boundaries while mitotic nuclei are more irregular in shape and have ragged boundaries. However, it is not always the case that mitotic epithelial cell nuclei are the darkest objects in a given file; for example stromal cells, lymphocytes and necrotic cells may be darker. Given the relatively low numbers of mitoses which may be present in any given tile and yet may indicate serious disease it is important that as many as possible are correctly identified while at the same time minimising the number of any normal cell nuclei or other objects incorrectly identified as mitotic.

Location of Candidate Cell Nuclei

Referring now to FIG. 2, the first processing stage 21 consists of locating all possible candidate cell nuclei. The approach adopted for identifying the locations of potential mitotic nuclei is based on the fact that they are generally darker than average nuclei. Mitotic nuclei appear in the image as solid dark objects (i.e. dark all the way through) most of the time, or instead occasionally they form groups of small dark clumps. Hence the aim is to find concentrations of dark pixels; these are not necessarily connected groups of dark pixels, but a region containing a sufficient number of clustered dark pixels.

There are various methods of doing this. One example is simple grey-level segmentation, where a threshold is chosen and only those pixels having grey-levels below this threshold are selected. The drawback of this approach is that some mitotic nuclei are not particularly dark, but are only distinguishable from their shape characteristics. Choosing a threshold sufficiently low to detect such nuclei would yield an excess of clutter.

The preferred approach is to use the multiresolution blob filtering described below. However, as will be apparent to those skilled in the image processing art, the present invention may be practised without employing this particular technique. Alternatives include the processes described as mitotic cueing in our copending United Kingdom patent application no. 0226787.0. The general principle is, given that the approximate size of the nuclei is known, to apply a radially-symmetric filter whose output is large in magnitude when there is a region of local brightness or darkness whose shape and size approximately matches that of the filter. This filter should be a difference filter with zero mean, so areas of constant intensity are suppressed.

The method will now be described in terms of a specific implementation, namely a multi-scale blob filter as known e.g. from "Multiresolution analysis of remotely sensed imagery", J. G. Jones, R. W. Thomas, P. G. Earwicker, Int J. Remote Sensing, 1991, Vol 12, No 1, pp 107-124. The process will be described for filtering the image using a particular size of blob filter, where these are defined at successive octave (powers of 2) scale sizes.

The recursive construction process for the multi-scale blob filter involves two filters; a 3×3 Laplacian blob filter (L) and a 3×3 smoothing filter (s) as defined below.

$$L = \begin{pmatrix} -1 & -1 & -1 \\ -1 & 8 & -1 \\ -1 & -1 & -1 \end{pmatrix}, s = \frac{1}{16}\begin{pmatrix} 1 & 2 & 1 \\ 2 & 4 & 2 \\ 1 & 2 & 1 \end{pmatrix}$$

These two filters form a basis for filtering over a set of octave scale sizes, according to the following process:

To enhance blob-shaped objects at the original resolution (octave scale 1, pixel size 1), the image is correlated with the 3×3 Laplacian filter alone:

$$F_1(m, n) = \sum_{i=-1}^{1} \sum_{j=-1}^{1} I(m+i, n+j) * L(i+2, j+2)$$

where I is the original image, and the range of the indices m and n is set such that the indices in the summation above are always within the original image dimensions (so m and n start at 2). Values of the filtered image at locations outside these ranges are set to zero.

For computational efficiency, multiplications by ±1 need not be performed explicitly. Thus the filter output value for a pixel located at position (i,j) is given by:

$$F_1(i,j)=8.I(i,j)-I(i-1,j-1)-I(i-1,j)-I(i-1,j+1)-I(j-1)-I(i,j+1)-I(i30\ 1,j-1)-I(i+1,j)-I(i+1,j+1)$$

To enhance blob-shaped objects at a resolution one octave above the original (octave scale 2, pixel size 3), the image is first correlated with the 3×3 smoothing filter (s), forming a smoothed image ($S_2$). The 3×3 Laplacian blob filter (L) is then expanded by a factor of two, by padding it with zeros, to form a 5×5 filter [−1 0 −1 0 −1; 0 0 0 0 0; −1 0 8 0 −1; 0 0 0 0; −1 0 −1 0 −1]. This is then correlated with the smoothed image ($S_2$) to form a filtered image ($F_2$), but for computational efficiency, only the non-zero filter coefficients are used, thus:

$$S_2(m,n) = \sum_{i=-1}^{1}\sum_{j=-1}^{1} I(m+i, n+j) * s(i+2, j+2)$$

$$F_2(m,n) = \sum_{i=-1}^{1}\sum_{j=-1}^{1} S_2(m+2i, n+2j) * L(i+2, j+2)$$

where I is the original image, and the range of the indices m and n is set such that the indices in the summation above are always within the original image dimensions (so m and n start at 4). Values of the filtered image at locations outside these ranges are set to zero.

The above double correlation is equivalent to a single correlation of the original image with a 7×7 filter formed from correlating the expanded 5×5 Laplacian with the 3×3 smoothing filter, but this larger filter is never formed explicitly.

To enhance blob-shaped objects at a resolution two octaves above the original (scale 3, pixel size 7), the smoothing filter is expanded by a factor of 2 in the same manner as the Laplacian above, then correlated with the smoothed image ($S_2$) above to give a lower-resolution smoothed image ($S_3$) thus:

$$S_3(m,n) = \sum_{i=-1}^{1}\sum_{j=-1}^{1} S_2(m+2i, n+2j) * s(i+2, j+2)$$

Following this, the 5×5 Laplacian filter is expanded by a factor of 2 by padding with zeros to form a 9×9 filter, which is correlated with the smoothed image ($S_3$) in the same computationally efficient manner, thus:

$$F_3(m,n) = \sum_{i=-1}^{1}\sum_{j=-1}^{1} S_3(m+4i, n+4j) * L(i+2, j+2)$$

This process is repeated to obtain results at successive octave scales, namely expanding both the smoothing filter and the Laplacian blob filter each time.

The above process may be used to produce a "blob-filtered" image at any of the required octave scales. Objects of interest (i.e. clusters of dark pixels in this case) will have the greatest values of the magnitude of the filter output The locally strongest filter output will occur at the centre of the object of interest. Individual objects (called "blobs") are now identified by finding local minima of the filter output, where each blob is assigned a position and intensity, the latter being the value of the filter output at the local minimum.

In this application, objects which are dark relative to the background are identified by finding local minima of the filter output at one chosen scale, in this instance octave scale 5 (a nuclear size of 31 pixels across).

For computational efficiency, the spatial resolution of the image is reduced prior to blob filtering, using the following thinning method. Each reduction in resolution by a factor of two (a "thin") is achieved by firstly correlating the image with the 3×3 smoothing filter(s), then sub-sampling by a factor of two. The formula for a single thin is:

$$T(m,n) = \sum_{i=-1}^{1}\sum_{j=-1}^{1} I(2m+i, 2n+j) * s(i+2, j+2)$$

where I is the original image, T is the thinned image, and the indices m and n range from 1 to the dimensions of the thinned image. Each dimension of the thinned image is given by subtracting 1 or 2 from the corresponding dimension of the original image, depending on whether this is odd or even respectively, then dividing by 2.

In this instance, the image is reduced in resolution by a factor of 4, by applying the above process twice, firstly on the original image, and then again on the resulting thinned image, to produce a new image whose linear dimensions are a quarter of the size of the original (area is 1/16). For example, an original image of a tile of size 1476×1160 pixels would become 368×289 pixels. Blobs are now extracted as described above from the reduced-resolution image at octave scale 3 (7×7 pixels across), this being equivalent to extracting scale 5 blobs from the original image, but being more computationally efficient.

This process identifies all objects which form dark clusters of the requisite size, which may include not only mitotic epithelial cell nuclei but also background clutter, stromal cells, lymphocytes and/or necrotic cells, plus fainter normal epithelial nuclei which are not of interest. Since it is known that the mitotic nuclei are likely to be much darker than average, only the darkest 10% of blobs are selected for further analysis. This is achieved by sorting the blobs into ascending order of filter output (so the darkest occur first), using a QuickSort algorithm (such as described in Klette R., Zamperoniu P., 'Handbook of Image Processing Operators', John Wiley & Sons, 1996), finding the 10$^{th}$ percentile of the sorted values, and choosing all blobs darker than this percentile.

Segmentation and First Clutter Rejection

The next processing stage 22 aims to find an approximate segmentation of the image, to separate regions (defined as connected sets of pixels) potentially associated with the cell nuclei of interest, from the background. The full-sized original image (red component) is used at the commencement of this stage.

Firstly, a grey-level threshold is selected. This is achieved by choosing a set of 15×15 pixel neighbourhoods centred on each of the blobs selected at the end of stage 21, collating all pixels within all these neighbourhoods into a single list, and computing the mean grey-level of these pixels.

A new thresholded binary image is now produced. Pixels in the red component of the original image whose grey levels are below (darker than) the threshold mean computed above are set to 1; remaining pixels are set to 0.

Connected component labelling is now applied to this binary image. This is a known image processing technique (such as described in A Rosenfeld and A C Kak, 'Digital Picture Processing', Vols. 1 & 2, Academic Press, New York, 1982) which gives numerical labels to connected regions in the binary image, these being groups of connected pixels whose values are all 1. An 8-connectedness rule is used, so pixels are deemed to be connected when they are horizontally, vertically, or diagonally adjacent. Each region corresponding to a selected blob from stage 21 is assigned a separate label, enabling pixels belonging to those regions to be identified. The following region properties are then computed:

Area= number of pixels within the region

Thickness=minimum thickness of the region, defined thus: for each pixel in the region, find the minimum distance from that pixel to the outside of the region. Thickness is then defined to be the maximum of these minimum distances. Note that thickness is not the same as width; for a rectangle the thickness is half the width, and for a circle the thickness is the radius.

Regions whose area is less than 190 pixels or whose thickness is less than 4 pixels are rejected, these being too small to be mitotic cell nuclei.

At this stage the mean grey-level of the pixels within each region is also calculated from the red component of the original image. The overall mean and standard deviation of these mean grey-levels is then found for later use in grey-level normalisation (stage 25).

Contour Selection

The next processing stage 23 incorporates two levels of contour selection to gain a better representation of the actual shape of the boundary of each remaining object at both low and high resolutions. Firstly, a low-resolution (large-scale) contour is computed, which gives an approximate shape, and secondly a high-resolution (small-scale) contour is found which gives a more accurate boundary representation. Following consistency checks between the two contours, attributes of the boundary are then measured from the small-scale contour.

For each of the objects remaining after stage 22, a local region of interest (ROI) is selected. This ROI is centred on the nominal centre of the object (as found in stage 21), and has an extent of 50 pixels in each direction, the region size being truncated as necessary to ensure the ROI lies within the bounds of the original image. This allows ROIs which would otherwise overlap the edges of the image to be included. Alternatively the ROIs could be defined by taking the regions identified in stage 22 and adding a border of a selected number of pixels. In either case, it is desirable that the ROIs exceed the size of those regions somewhat in order to ensure the generation of the low-resolution contours.

To find a low-resolution representation for the boundary of each object, the region defined by the ROI above is used to define a sub-image within the output of the blob filter (stage 21). This sub-image will consist of both positive and negative grey levels. Contours at two levels within this sub-image are then sought, namely at levels 0 and −10 which have been found to be best experimentally. By virtue of the operation of the blob filter in stage 21, the zero level contour in the respective sub-image is that contour which exhibits the highest edge strength. A contour is a curve consisting of points of equal value for some given function; in this case the function is defined by the grey-level pixel values. In this embodiment, the Matlab® contour function is employed but any contouring algorithm can be used which returns contours in the same form, as a set of contiguous points ordered around the contour; (Matlab® is a well known computational tool from The MathWorks, Inc.). Matlab® returns a set of locations with sub-pixel resolution which are in order of location around the contour, i.e. traversing the set of locations is equivalent to walking around the contour. Contours are only treated as valid if they satisfy all the following four conditions:

they form closed loops within the ROI, i.e. the last contour point is the same as the first contour point;

they are consistent with the location of the object (there is at least one contour point whose distance from the nominal centre of the object is less than or equal to 30 pixels);

they have a sufficiently similar area to the "nominal area" found from the grey-level segmentation computed in stage 22 (the definition of the area within a contour is given later in this section). The contour area must be at least 50% of the nominal area;

they have the correct grey-level orientation, namely pixels within the contour are darker than those outside the contour.

The object is retained for further analysis (maintained in list in computer) only if a valid contour is found from at least one of the two contour levels (0 and −10). If both contour levels yield a valid contour, then the latter one (−10) is chosen for further use.

To find a high-resolution representation, the region defined by the ROI above is taken out from the red component of the original image to form a sub-image. Contours are not extracted from the image at its original resolution, because these have been found to be too rough. Instead, the resulting sub-image is expanded in size by a factor of two, using the Matlab® bilinear interpolation function, to give additional resolution. In bilinear interpolation, to find the values of a selected point not on the original image grid, its four nearest grid points are located, and the relative distances from the selected point to each of its four neighbours are computed. These distances are used to provide a weighted average for the grey-level value at the selected point.

This interpolated image is then smoothed before contouring, by correlating (see earlier description with reference to stage 21) with a 3×3 smoothing filter(s) defined thus:

$$s = \frac{1}{16}\begin{pmatrix} 1 & 2 & 1 \\ 2 & 4 & 2 \\ 1 & 2 & 1 \end{pmatrix}$$

Valid contours are then sought at each of several threshold levels. The range of threshold levels starts at the minimum grey-level within the sub-image, and increases up to the maximum grey-level in steps of 10 grey levels, so the actual contour levels are set adaptively. Valid contours are defined in the same manner as for the low-resolution boundary above.

Having found a set of valid contours at each threshold level, the edge strength at each point on the contour is estimated. The edge strength at each image pixel is defined as the modulus of the vector gradient of the original red component of the image I, where the vector gradient is defined asgra $$gradI = \left(\frac{\partial I}{\partial x}, \frac{\partial I}{\partial y}\right),$$

where the two partial derivatives are obtained from taking differences in pixel grey-level values in the X and Y directions respectively. The edge strength at contour points which lie between image pixels is estimated using bilinear interpolation (as described above) from the nearest pixel values. The mean edge strength around the contour is then computed. The contour having the greatest edge strength is chosen as being the most representative of the boundary of the object. If no valid contours are found, the object is rejected.

A consistency check between the low-resoluton and high-resolution contours is then performed. The area within each contour is computed from the boundary contour using Green's Theorem (such as described in Chap 6 in Vector Analysis and Cartesian Tensors', D. E. Bourne and P. C. Kendal, $2^{nd}$ ed, Nelson, 1977). This gives the following formula for area:

$$A = \left| x_n(y_1 - y_n) + \sum_{i=1}^{n-1} x_i(y_{i+1} - y_i) \right|$$

where $(x_i, y_i)$ are the contour points.

These areas are then subjected to the following tests:
High-resolution area>0.6*low-resolution area
High-resolution area<1.4*low-resolution area
If either of these tests fail, the object is rejected.

Finally, there is a check that the low- and high-resolution contours for each object overlap sufficiently. For each object, two binary images are formed. The first binary image is formed by setting the value of pixels which lie within the low-resolution. contour to 1, and those pixels outside the contour to 0, using the Matlab® function roipoly. The second binary image is formed in the same way from the high-resolution contour. The absolute difference of these two images is taken, resulting in another binary image in which pixels are set to 1 if and only if they lie within one of the contours and not the other, and 0 otherwise. Connected component labelling (see stage 22 description) is applied to this new binary image to identify separate regions. The thickness of each of these regions is computed (as in stage 22). If any region thickness exceeds 5 pixels, the corresponding object is rejected.

Figure 3:
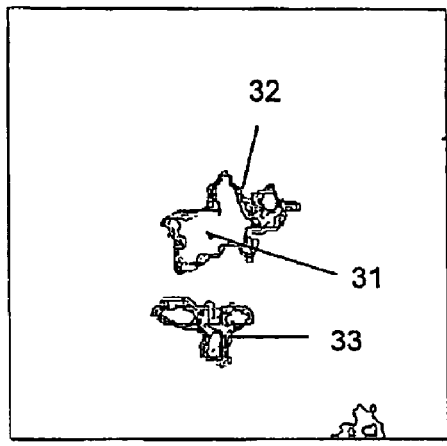
FIGS. 3 and 4 are simplified visualisations of the contour selection stage of the process of FIG. 2.
Figure 3:
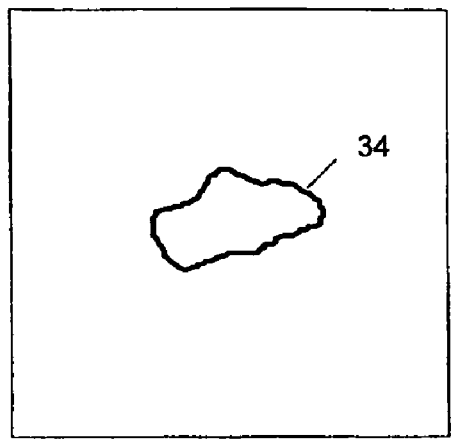
Figure 3:
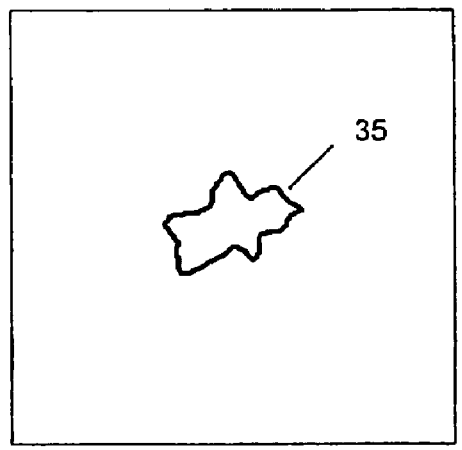
Figure 3:
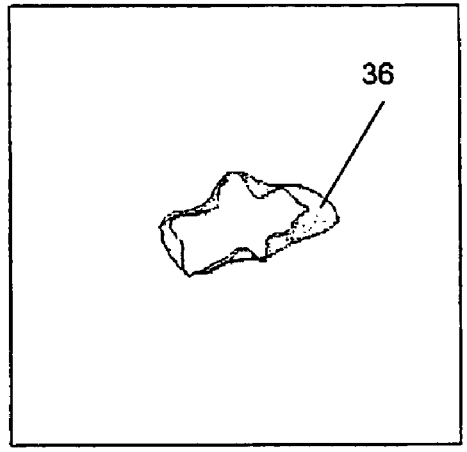
Figure 4:
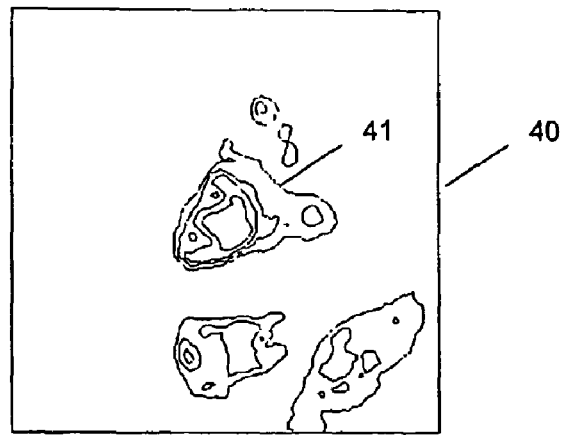
Figure 4:
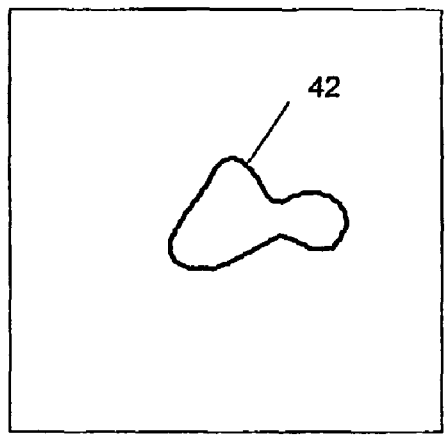
Figure 4:
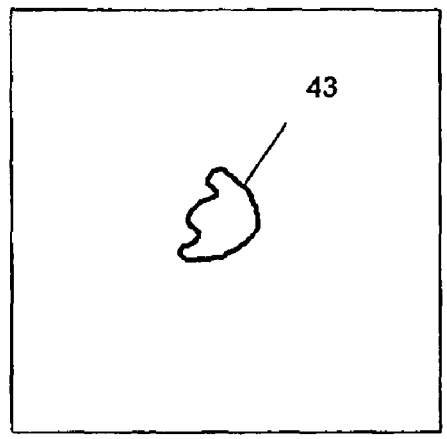

Simplified visualisations of the effects of the stage 23 processing are shown in FIGS. 3 and 4.

In FIG. 3(a) a local region of interest 30 is defined around the nominal centre 31 of an object 32 which is represented in this Figure by a series of contours. A second object 33 also appears in the same sub-image. FIG. 3(b) illustrates the low-resolution boundary contour 34 computed for the object 32 and FIG. 3(c) the high-resolution boundary contour 35 computed for the same. FIG. 3(d) illustrates the overlap between these two resolutions with the region of difference 36 shaded. In this case the areas within the contours 34 and 35 are sufficiently similar and the thickness of the region 36 is sufficiently small to pass all the above-mentioned consistency checks and the object 32 will be retained. In effect these checks are showing that the object is sufficiently uniformly dark to potentially represent a mitotic cell nucleus. The object 33 will not be treated as valid for the ROI 30 because its contours are not consistent with the centre 31. It will, however, be separately analysed within a separate ROI (not shown) defined around its own nominal centre.

In FIG. 4(a) there is another example of a local region of interest 40 defined around an object 41. FIG. 4(b) illustrates the (ow-resolution boundary contour 42 computed for this object and FIG. 4(c) the high-resolution boundary contour 43. In this case the area of the contour 43 is substantially less than that of the contour 42 (approximately 0.4) so it fails the first of the above-mentioned consistency checks and the object 41 will not be processed further. This is indicative of a normal epithelial cell nucleus which has a relatively darker nucleolus (chosen as the high-resolution boundary because of its high edge strength) surrounded by a less dark region (chosen as the low-resolution boundary).

Boundary Tracking

The next processing stage 24 applies a tracking algorithm to the high-resolution contour representing the object's boundary for each object retained from the previous stage 23 in order to estimate curvature. The aim is to smooth the boundary and then measure curvature, because simply calculating curvature from the contour segments gives too rough a measurement. For the identification of mitotic cell nuclei the degree of non-convexity of the boundary is of interest, so the latter method of calculation is inappropriate.

The particular algorithm which has been used in the preferred embodiment is based on a Probability Density Association Filter (PDAF), such as described in Y.Bar-Shalom and T. E. Fortmann, "Tracking and Data Association", Mathematics in Science and Engineering series, vol 179, Orlando, Fla., Academic Press, 1988. This type of tracking algorithm is designed to estimate the parameters of a chosen object (target) in the presence of other measurements which are not related to the object in question (noise and clutter). In this case the 'target' state variables are the position, orientation and curvature of the object's boundary, and the measurements are the positions of the contour points and the orientations of the lines joining each pair of contour points.

The PDAF filter requires a model for the dynamics of the boundary state. The boundary dynamics is given by a constant curvature (the radius of curvature is set to 10 pixels) plus an assumed random perturbation known as system noise. This noise is determined by the variance of curvature perturbation, which is chosen according to how irregular the boundary of a mitotic cell nucleus is expected to be. In the preferred embodiment the curvature variance is 9 for position and 0.09 for angle (in radians).

As a starting point, it is assumed that for each object potentially representing a mitotic cell nucleus a connected set of edge features has been extracted from the image. In this case, edge features are line segments joining two adjacent contour points. Each edge feature has the following measurements that were made as part of the contour extraction process:

Position $x_m$, $y_m$ (horizontal and vertical image coordinates) of the centre of the edge Orientation $\theta_m$, i.e. the angle between the edge and the horizontal.

The purpose of the tracker is to estimate the most likely true location, orientation and curvature $x_s$, $y_s$, $\theta_s$, $\kappa$ of the boundary at each point from the above measurements, given that there are measurement errors with an assumed Gaussian distribution. The following information vectors are defined:

The measurement vector $z=(x_m, y_m, \theta_m)$;

The system state vector $x=(x_s, y_s, \theta_s, \kappa)$.

To use the PDAF filter to do this, the following information about the true boundary and the measurement process is required:

The relationship between the position, orientation and curvature-of neighbouring points on the boundary (the system model). This incorporates a transition matrix $\Phi$ linking neighbouring states x and a system noise model that adds extra random perturbations to x.

The relationship between the measurement vector z and the system state x. This incorporates a transition matrix H linking x to z and a measurement noise model that adds extra random perturbations to z.

It is assumed that not all of the edge features are associated with the nuclear boundary; the ones that are not are denoted clutter.

In its most general form the PDAF processes several measurements z at each step in estimating x. In this case only one edge feature is processed at a time, so there are only two hypotheses to be tested; either the feature is from clutter or from the real nuclear boundary.

The system transition matrix $\Phi$ is based on constant curvature, so to predict a neighbouring system state the unique circle or straight line with curvature $\kappa$, tangent slope $\theta_s$ going through the point $x_s$, $y_s$ is extrapolated to the point that is closest to the next measurement point.

The system noise has a Gaussian distribution with zero mean and a covariance matrix based on independent perturbations in curvature, orientation and lateral offset (movement in a direction normal to the boundary). A Brownian model is used, where the standard deviations of perturbations in curvature, orientation and lateral offset are proportional to the square root of the arc length of the extrapolated circle of the previous paragraph. The accumulated effect of curvature perturbation on orientation and lateral offset is also modelled, resulting in the following covariance matrix:

$$Q = \sigma_k^2 \begin{pmatrix} s & \frac{1}{2}s^2 & \frac{1}{6}s^3 \\ \frac{1}{2}s^2 & \frac{1}{3}s^3 & \frac{1}{8}s^4 \\ \frac{1}{6}s^3 & \frac{1}{8}s^4 & \frac{1}{20}s^5 \end{pmatrix} + s \begin{pmatrix} 0 & 0 & 0 \\ 0 & \sigma_{s\theta}^2 & 0 \\ 0 & 0 & \sigma_{sy}^2 \end{pmatrix}$$

with respect to the system curvature $\kappa$, system slope $\theta$ and lateral offset respectively, where s is the arc length (the circular distance between the previous point and the estimate of the next point). The constants $\sigma_\kappa$, $\sigma_{s\theta}$, $\sigma_{sy}$ define the average roughness of the nuclear boundary, and depend on the type of cell being analysed.

The measurement transition matrix H maps the system parameters to the measurement parameters in the natural way:

$$\begin{pmatrix} x_m \\ y_m \\ \theta_m \end{pmatrix} = H \begin{pmatrix} x_s \\ y_s \\ \theta_s \\ \kappa \end{pmatrix}, \quad H = \begin{pmatrix} 1 & 0 & 0 & 0 \\ 0 & 1 & 0 & 0 \\ 0 & 0 & 1 & 0 \end{pmatrix}$$

The measurement noise is based on independently Gaussian distributed perturbations of slope and lateral offset, resulting in the following covariance matrix with respect to measurement slope and lateral offset respectively:

$$R = \begin{pmatrix} \sigma_{m\theta}^2 & 0 \\ 0 & \sigma_{my}^2 \end{pmatrix}$$

The constants $\sigma_{m\theta}$, $\sigma_{my}$ define the average smoothness of the nuclear boundary, and depend on the type of cell being analysed.

The following constants are used to define the clutter model:
$\rho$=Clutter density=average number of edges per unit area that are not associated with the nuclear boundary.
$P_D$=Probability that the edge feature is associated with the true nuclear boundary.

These constants depend on the clutter present in the image, both its edge strength relative to the nuclear boundary and its average spatial density.

For a nucleus with average radius r the following parameters of the above model are used (all units are image pixels):
$\sigma_\kappa = r^{-3/2}$
$\sigma_{my}=3$
$\sigma_{m\theta}=0.3$ radians
$\sigma_{xy}=0.9$
$\sigma_{x\theta}=0.09$ radians
$\rho=0.01$
$P_D=0.8$ The initial value for the system covariance matrix M is given by:

$$M_0 = \begin{pmatrix} \sigma_{my}^2 & 0 & 0 \\ 0 & \sigma_{m\theta}^2 & 0 \\ 0 & 0 & \sigma_{kO}^2 \end{pmatrix}, \text{ where } \sigma_{kO} = 1/r$$

The PDAF estimator is now applied sequentially as follows. The matrices $H_k$, $Q_k$ and $R_k$ are all constant in this application (as defined above). The following expressions are those known from the Bar-Shalom and Fortmann reference quoted above.

Update
Innovation $$\underline{v}'_k = \sum_{i=1}^{N_k} \beta_{ki} \underline{v}_{ki} \text{ where } \underline{v}_{ki} = z_{ki} - H_k \bar{\underline{x}}_k$$

Kalman Gain Matrix $$K_k = M_k H_k^T S_k^{-1} \text{ where } S_k = H_k M_k H_k^T + R_k$$

Beta Weights $$\beta_{ki} = \begin{cases} e_{ki} / \left[ b + \sum_{j=1}^{N_k} e_{kj} \right] & \text{for } i \neq 0 \\ b / \left[ b + \sum_{j=1}^{N_k} e_{kj} \right] & \text{for } i = 0 \end{cases}$$

where $e_{ki} = \exp\left(-\frac{1}{2} \underline{v}_{ki}^T S_k^{-1} \underline{v}_{ki}\right)$ for $i \neq 0$, and $b = \rho(1 - P_D)\sqrt{|2\pi S_k|} / P_D^2$ State Estimate Update $$\hat{\underline{x}}_k = \bar{\underline{x}}_k + K_k \underline{v}'_k$$

Error Covariance Update $$P_k = \beta_{k0} M_k + (1 - \beta_{k0}) P^* + K_k \left[ \left( \sum_{i=1}^{N_k} \beta_{ki} \underline{v}_{ki} \underline{v}_{ki}^T \right) - \underline{v}'_k \underline{v}'^T_k \right] K_k^T$$

where $P^* = [I - K_k H_k] M_k$

Prediction
State Estimate Extrapolation $$\bar{\underline{x}}_{k+1} = \Phi_k \hat{\underline{x}}_k$$

Error Covariance Extrapolation $$M_{k+1} = \Phi_k P_k \Phi_k^T + Q_k$$

This process continues until the entire contour is traversed (i.e. returned to the starting point). This is then repeated around the contour for a second time (using the final conditions from the first pass as starting conditions for the second pass); this ensures that the final estimate of the smoothed contour is independent of the assumed initial conditions.

The curvature of the smoothed contour derived from the PDAF tracker is now used to find a measure of the degree of non-convexity of the object's boundary. Firstly, the sign of the curvature is set so that it is positive where the boundary is locally convex and negative where locally concave (as viewed from outside the boundary). All positive values of curvature are then set to zero, leaving non-zero values only at locations where the boundary is locally concave. A graph of curvature (Y-axis) against perimeter arc length i.e. distance along the boundary (X-axis) is plotted, then the line integral of curvature with respect to arc length is computed. The absolute value of this integral is taken to produce a non-negative result. The final result is a dimensionless quantity giving an indication of overall non-convexity, called the "negative curvature area". Objects which are almost completely convex, in this case whose negative curvature area is less than 0.2, are then rejected.

The output from this process is a set of boundary measurements for each object, namely negative curvature area, and a more precise estimate of area.

Grey-Level Normalisation

Next a normalisation process 25 is carried out to allow for differences in overall brightness between different slides. For each remaining object, the mean grey level of the pixels enclosed within (but not on) the high-resolution contour found in stage 23 is calculated. The statistics used for normalisation are the overall mean and standard deviation of the grey levels of the regions obtained from stage 22. Each object's grey level is then normalised (by subtracting this mean and dividing by this standard deviation). The output is a statistic for each assumed nucleus.

Second Clutter Rejection

The next process 26 involves a second stage of classification and clutter rejection based on the Fisher classifier to discriminate between objects representing mitotic and non-mitotic nuclei. The Fisher classifier is a known statistical classification method described for example in Section 4.3 of "Statistical Pattel Recognition" by Andrew R. Webb, Arnold Press, 1999, and is preferred for this stage of the process due to its robustness against overtraining.

In this case the Fisher classifier uses a set of information about each object that has been derived by analysis as described above. Each information set is a feature vector, that is an ordered list of real numbers each describing some aspect of the object; each component number is denoted an object feature. The purpose of the classification algorithm is to discriminate between two classes of object based on the information contained in their feature vectors. The output of the algorithm is a set of numbers, one for each object, indicating the likelihood that the nucleus which it represents is a member of one of the two chosen classes (in this case the classes are mitotic and non-mitotic).

For a given feature vector x, the standard implementation of the Fisher classifier output is defined as:

$$F = \sum_{k=1}^{n} a_k x_k$$

where $x=[x_1, \ldots x_k]$ is the feature vector. In this embodiment, this definition has been extended to use non-linear functions of the feature vector, namely:

$$F = \sum_{k=1}^{n} a_k g_k(x)$$

where $a_k$ are prescribed real numbers and $g_k$ are prescribed functions of the feature vector x. These functions and variables are chosen to give the lowest number of misclassifications for objects with known class.

The components of the feature vector x are mean grey level (computed in stage 25) and negative curvature area (computed in stage 24). In principle area could also be used, since smaller mitotic cell nuclei tend to be darker and less concave than larger ones. In this case a quadratic set of basis functions ($g_k$) are used, so that the Fisher classifier value is given by:

$$F=a_1 G+a_2 G^2+a_3 C+a_4 GC+a_5 C^2+a_6$$

where G is the normalised grey-level, C is the negative curvature area, and the coefficients $a_1$ are derived from the training stage referred to below.

Figure 5:
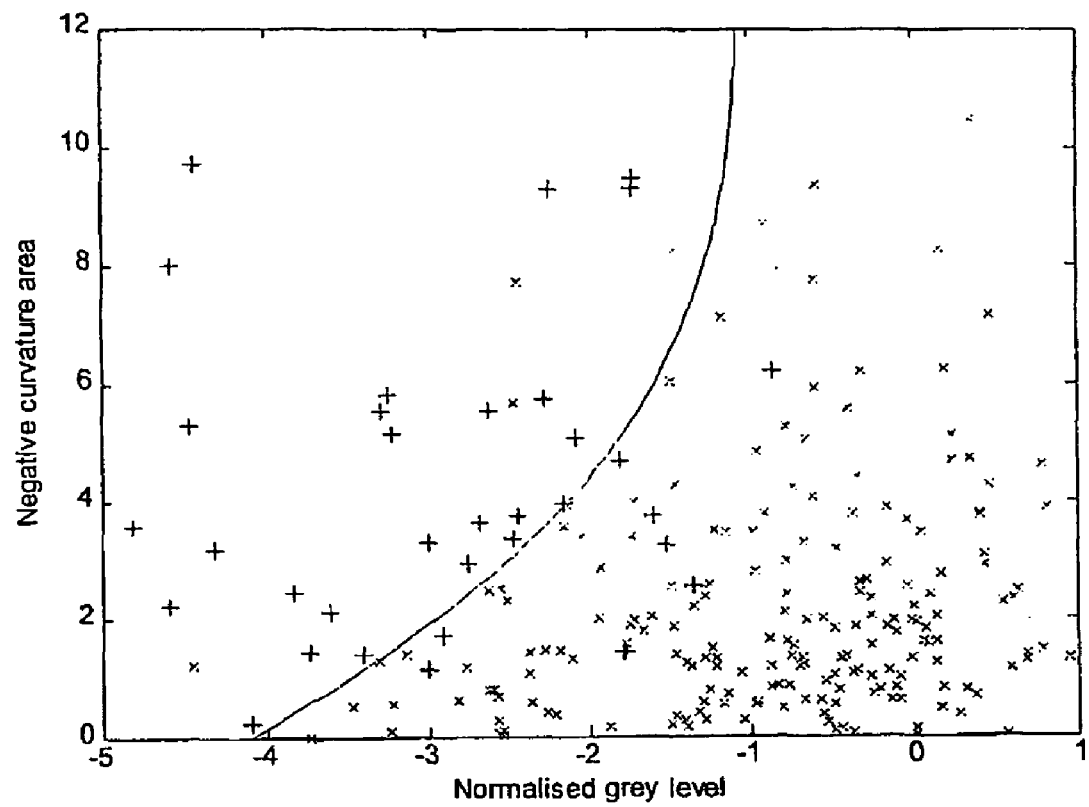
FIG. 5 illustrates a decision boundary in a Fisher classifier as used in a later stage of the process of FIG. 2.

The coefficients and decision boundary for the Fisher classifier are obtained by training the classifier on a large number of example slides provided by a histopathologist where accurate ground truth (sets of mitotic and non-mitotic cells) is also available. The training stage results in a classifier boundary which minimises the total number of misclassifications, i.e. both false negatives (missed mitotic cells) and false positives (falsely-detected non-mitotic cells). In the preferred embodiment the resulting coefficients ai that have been derived from this training stage are [−0.87431, 0.10205, 0.84614, −0.18744, −0.04954, −5.56334]. FIG. 5 illustrates the classifier together with the data on which it was trained, where plusses indicate mitotic cells and crosses indicate non-mitotic cells.

Mitosis Count

Stage 27 counts the number of objects deemed to represent the nuclei of mitotic cells, that is to say only those objects whose values exceed a given threshold in the output of the Fisher classifier. The preferred criterion is F>0 (illustrated as the decision boundary in FIG. 5), set to give the optimum trade-off between missed mitotic cells and falsely-detected non-mitotic cells. The number of objects whose classifier value exceeds this threshold defines the mitotic count for that tile. The count for the ten tiles analysed is aggregated, and can be converted into an indication of cancer grade in accordance with a table as previously described in connection with the existing manual procedure.

It will be appreciated that the coding of a computer program to implement all of the processing stages described above for the preferred embodiment of the invention can be achieved by a skilled programmer in accordance with conventional techniques. Such a program and code will therefore not be described further.

The invention claimed is:

1. A method for analysis of a digital image comprising an array of pixels and including a plurality of objects, which method comprises using a computer or processor to perform the successive steps of:
   (a) identifying locations within the image of those of said objects which have specified intensity and size characteristics;
   (b) defining respective local regions of interest within the image around those of said objects which have said specified intensity and size characteristics;
   (c) deriving from data within said respective local regions one or more respective closed contours comprising points of equal intensities; and
   (d) estimating the curvature of at least one of said respective closed contours within said respective local regions and producing at least a measure of any concavity thereof.

2. A method according to claim 1 wherein step (a) comprises the application of a radially-symmetric difference filter with zero mean.

3. A method according to claim 2 wherein the image is filtered at a plurality of resolutions of increasing scale.

4. A method according to claim 2 wherein said locations are identified in accordance with locations of respective local extrema in the output of said filter.

5. A method according to claim 4 including the step of sorting, in order of intensity, local extrema in the output of said filter and selecting for further analysis only those objects which correspond to a specified proportion of said extrema in such order.

6. A method according to claim 1 further comprising, following step (a):
  selecting an intensity threshold related to the mean intensity of pixels within the image in neighbourhoods of said locations;
  creating a binary image according to whether pixels in the first-mentioned image are above or below said threshold;
  identifying regions in the binary image composed of connected pixels which are below said threshold in the first-mentioned image; and
  rejecting from further analysis those objects which correspond to such regions in the binary image which fall below a specified size or thickness.

7. A method according to claim 1 wherein step (c) comprises, for said respective local regions, deriving respective first and second said contours having respectively lower and higher resolutions, determining whether the sizes and locations of said first and second contours are consistent within specified criteria and, if so consistent, selecting said second contour for step (d).

8. A method according to claim 7 wherein, for said respective local regions, the first said contour is derived by:
  seeking within the region one or more contours of respective specified intensities;
  determining whether the or each such contour is a closed contour and meets specified location, size and/or intensity orientation criteria; and
  if more than one such contour is a closed contour and meets such criteria, selecting from the same the contour of the lowest intensity.

9. A method according to claim 8 wherein said specified intensities are no greater than that which corresponds to the contour of highest edge strength within the respective region.

10. A method according to claim 9 wherein step (a) comprises the application of a radially-symmetric difference filter with zero mean and said first contour is derived by seeking one or more contours in the output of said filter for the respective region and said specified intensities are no greater than the zero level in such output.

11. A method according to claim 8 wherein, for said respective local regions, the second said contour is derived by:
  seeking within the region a plurality of contours of respective specified intensities ranging between the lowest and highest intensities within the region;
  determining whether each such contour is a closed contour and meets specified location, size and/or intensity orientation criteria; and
  if more than one such contour is a closed contour and meets such criteria, selecting from the same the contour having the highest edge strength.

12. A method according to claim 1 wherein step (d) includes the application of a Probability Density Association Filter to said respective contours.

13. A method according to claim 1 wherein step (d) comprises, for said respective closed contours:
  measuring the curvature of the contour at a plurality of points around the contour, convexity and concavity being of opposite sign;
  setting convex values of such curvature to zero;
  plotting resultant values of curvature at said points against a measure of the distance of the respective point along the contour; and
  computing as said measure of concavity the line integral of such plot.

14. A method according to claim 1 further comprising the step of:
  (e) classifying objects into one of at least two classes in accordance with a function of said measure of concavity of a contour corresponding to the respective object and a measure of the mean intensity of the respective object.

15. A method according to claim 14 wherein step (e) is performed by use of a Fisher classifier.

16. A method according to claim 14 wherein the intensities of respective objects are normalised prior to step (e).

17. A method according to claim 14 further comprising the step of:
  (f) counting the number of objects classified into a specified one of said classes.

18. A method according to claim 1 wherein the image is of a histological or cytology specimen or of a soil sample.

19. The method according to claim 1 wherein a diagnostic report is produced following step (d).

20. A method according to claim 17, wherein the image is of a section of breast tissue and said specified class is identified as the class of mitotic epithelial cell nuclei.

21. A method for identification of mitotic activity from a digital image of a histological specimen including a plurality of objects, which method comprises using a computer or processor to perform the successive steps of:
  (a) identifying locations within the image of those of said objects which have specified intensity and size characteristics associated with epithelial cell nuclei;
  (b) defining respective local regions of interest within the image around those of said objects which have said specified intensity and size characteristics;
  (c) deriving from data within said respective local regions one or more respective closed contours comprising points of equal intensities;
  (d) estimating the curvature of at least one of said respective closed contours within said respective local regions and producing at least a measure of any concavity thereof; and
  (e) classifying objects as representing mitotic cell nuclei as a function of at least said measure of concavity of a contour corresponding to the respective object.

22. The method according to claim 21 wherein a diagnostic report is produced following step (d).

23. A computer-readable non-transitory medium comprising instructions to cause a computer to execute a method for analysis of a digital image comprising an array of pixels and including a plurality of objects, the method including the successive steps of:
  (a) identifying locations within the image of those of said objects which have specified intensity and size characteristics;
  (b) defining respective local regions of interest within the image around those of said objects which have said specified intensity and size characteristics;
  (c) deriving from data within said respective local regions one or more respective closed contours comprising points of equal intensities; and
  (d) estimating the curvature of at least one of said respective closed contours within said respective local regions and producing at least a measure of any concavity thereof.

* * * * *